(12) United States Patent
Tiwari et al.

(10) Patent No.: US 12,219,345 B2
(45) Date of Patent: Feb. 4, 2025

(54) METHOD AND APPARATUS FOR PROVIDING UE RADIO CAPABILITIES IN HANDOVER PROCEDURE

(71) Applicant: Samsung Electronics Co., Ltd., Gyeonggi-do (KR)

(72) Inventors: Kundan Tiwari, Bangalore (IN); Lalith Kumar, Bangalore (IN); Anikethan Ramakrishna Vijaya Kumar, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 287 days.

(21) Appl. No.: 17/763,046

(22) PCT Filed: Sep. 29, 2020

(86) PCT No.: PCT/KR2020/013301
§ 371 (c)(1),
(2) Date: Mar. 23, 2022

(87) PCT Pub. No.: WO2021/066501
PCT Pub. Date: Apr. 8, 2021

(65) Prior Publication Data
US 2022/0330120 A1     Oct. 13, 2022

(30) Foreign Application Priority Data

Oct. 4, 2019   (IN) .............................. 201941040399
Sep. 24, 2020  (IN) .............................. 201941040399

(51) Int. Cl.
*H04W 36/14*     (2009.01)
(52) U.S. Cl.
CPC .................. *H04W 36/14* (2013.01)

(58) Field of Classification Search
None
See application file for complete search history.

(56) References Cited

U.S. PATENT DOCUMENTS 8,289,922 B2    10/2012  Ewe et al.
2011/0090873 A1  4/2011  Lee et al.
(Continued)

FOREIGN PATENT DOCUMENTS

CN        102067669        5/2011
WO     WO 2018/205100     11/2018
(Continued)

OTHER PUBLICATIONS

European Examination Report dated Oct. 5, 2023 issued in counterpart application No. 20872272.8-1216, 6 pages.
(Continued)

*Primary Examiner* — Robert M Morlan
(74) *Attorney, Agent, or Firm* — The Farrell Law Firm, P.C.

(57) ABSTRACT

This disclosure provides a method for providing user equipment (UE) radio access capabilities in a handover procedure. The method includes identifying, by a source next-generation radio access network (NG-RAN), that a target public land mobile network (PLMN) does not support a UE radio access capabilities identifier (RAC ID) assigned by a source PLMN in an inter-PLMN handover procedure. Further, the method includes providing, by the source NG-RAN, to a target NG-RAN, the UE radio access capabilities instead of the UE RAC ID in response to identifying that the target PLMN does not support the UE RAC ID assigned by the source PLMN.

10 Claims, 10 Drawing Sheets

(56) References Cited

U.S. PATENT DOCUMENTS

| | | | |
|---|---|---|---|
| 2018/0139661 A1 | 5/2018 | Kumar et al. | |
| 2019/0141586 A1 | 5/2019 | Olsson et al. | |
| 2021/0352467 A1* | 11/2021 | Palat | H04W 36/08 |
| 2022/0109746 A1* | 4/2022 | Lindheimer | H04W 28/18 |
| 2023/0337069 A1* | 10/2023 | Shi | H04W 36/0011 |

FOREIGN PATENT DOCUMENTS

| | | |
|---|---|---|
| WO | WO 2019/071900 | 4/2019 |
| WO | WO 2019/091639 | 5/2019 |

OTHER PUBLICATIONS

Vivo, "PLMN Assigned Radio Capability ID Transfer during Inter PLMN Mobility", S2-1906935, SA WG2 Meeting #134, Jun. 24-28, 2019, 34 pages.

3GPP TR 23.743 V2.0.0, 3GPP, 3rd Generation Partnership Project; Technical Specification Group Services and System Aspects; Study on Optimisations of UE Radio Capability Signalling (Release 16), Mar. 2019, 57 pages.

ZTE Corporation et al., "Consideration on UE Radio Capability ID Signaling in Inter-node RRC Messages", S2-1912672, 3GPP TSG-RAN WG2 Meeting#107bis, Oct. 14-18, 2019, 5 pgs.

Huawei, Ericsson, "Capability ID Storage and Usage in RAN", R3-190881, 3GPP TSG-RAN3 Meeting #103, Feb. 25-Mar. 1, 2019, 4 pages.

European Search Report dated Jul. 4, 2022 issued in counterpart application No. 20872272.8-1216, 10 pages.

3GPP TR 23.743 V16.0.0, 3rd Generation Partnership Project; Technical Specification Group Services and System Aspects; Study on Optimisations on UE Radio Capability Signalling (Release 16), Mar. 2019, 56 pages.

Sony, Deutsche Telekom, "Corrections and Improvements of PLMN Assigned Capability Signaling", S2-1907016, 3GPP TSG-SA WG2 Meeting #134, Jun. 24-28, 2019, 26 pages.

Nokia, Nokia Shanghai Bell, "Switching and Coexistence between PLMN Assigned and UE Manufacturer Assigned UE Radio Capability IDs", S2-1907825, 3GPP TSG-SA WG2 Meeting #134, Jun. 24-28, 2019, 4 pages.

Chinese Office Action dated Feb. 7, 2024 issued in counterpart application No. 202080068631.0, 14 pages.

PCT/ISA/210 Search Report issued on PCT/KR2020/013301, Dec. 30, 2020, pp. 3.

PCT/ISA/237 Written Opinion issued on PCT/KR2020/013301, Dec. 30, 2020, pp. 4.

CATT, MediaTek Inc., 3GPP TSG-RAN WG2 Meeting #107 R2-1909919 Prague, Czech Republic, Aug. 16, 2019, pp. 5.

Spreadtrum Communications, 3GPP TSG-RAN WG2 Meeting #107 R2-1909091 Prague, Czech Republic, Aug. 15, 2019, pp. 5.

ETSI TS 138 331 V15.7.0, Sep. 27, 2019, 5G; NR; Radio Resource Control (RRC); Protocol specification (3GPP TS 38.331 version 15.7.0 Release 15), pp. 525.

MediaTek Inc., 3GPP TSG-RAN2 Meeting #107 R2-1909046 Prague, Czech Republic, Aug. 16, 2019, pp. 5.

\* cited by examiner

[Fig. 6a]
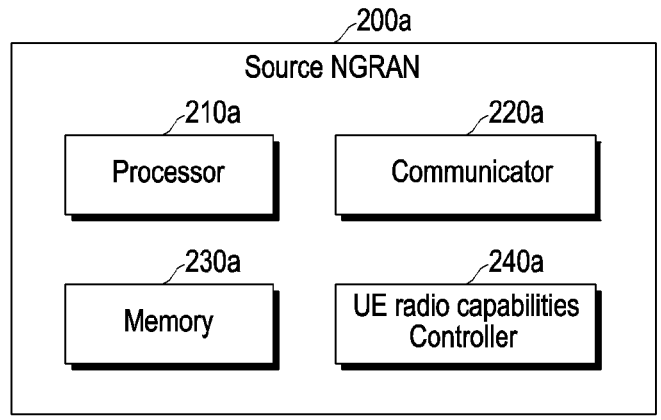
[Fig. 6b]
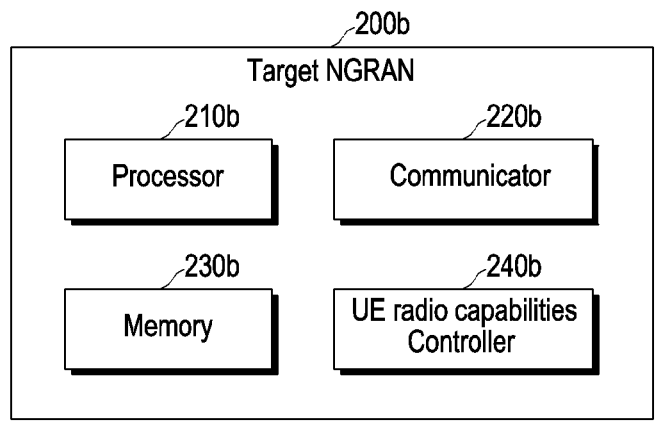
[Fig. 6c]
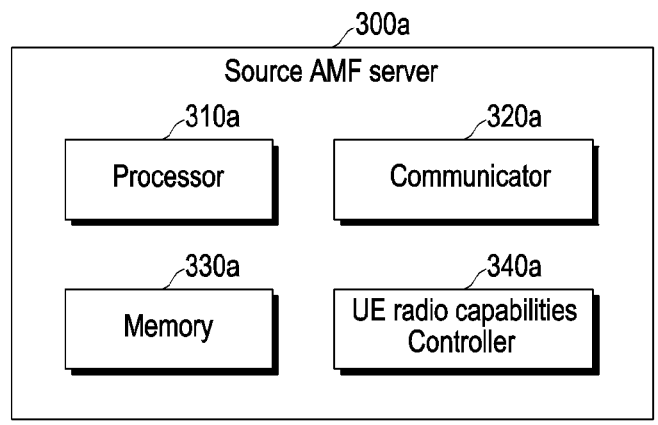

[Fig. 6d]
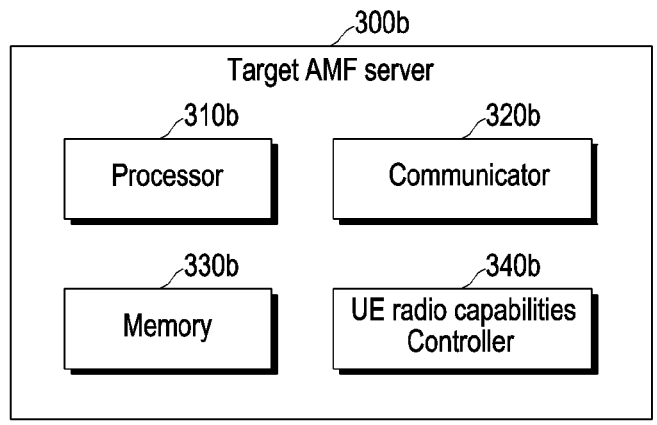
[Fig. 7a]
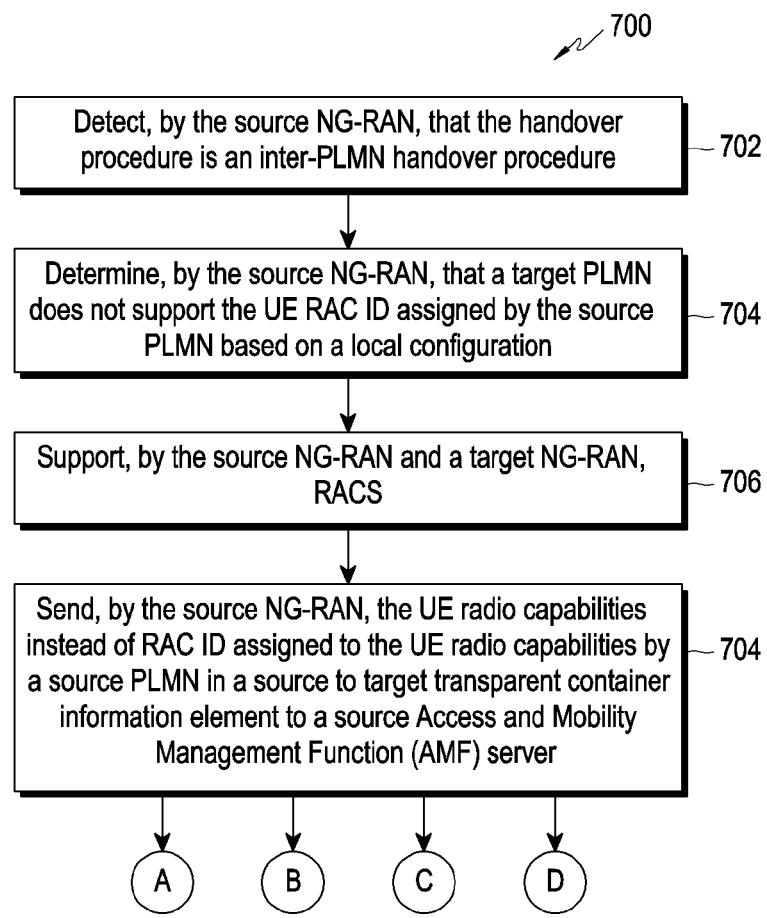

[Fig. 7b]
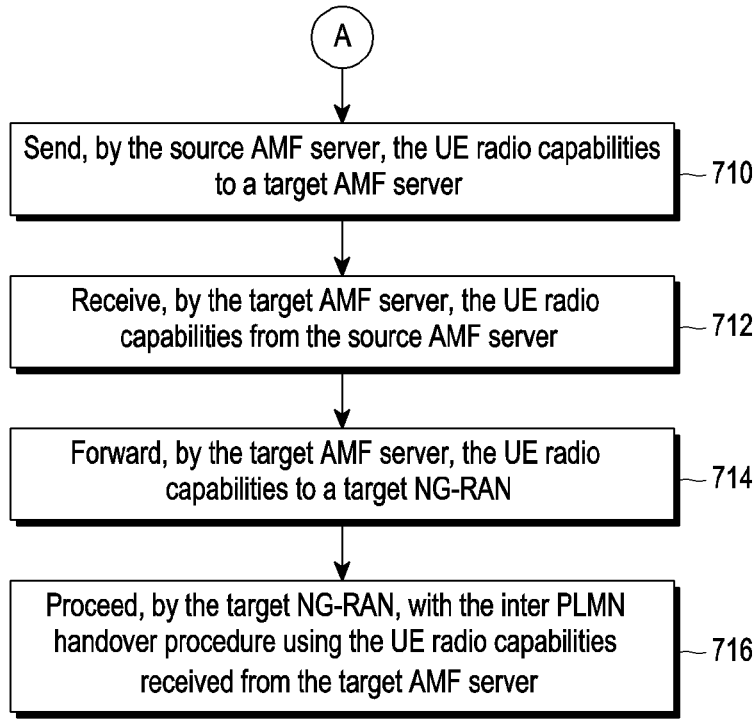
[Fig. 7c]
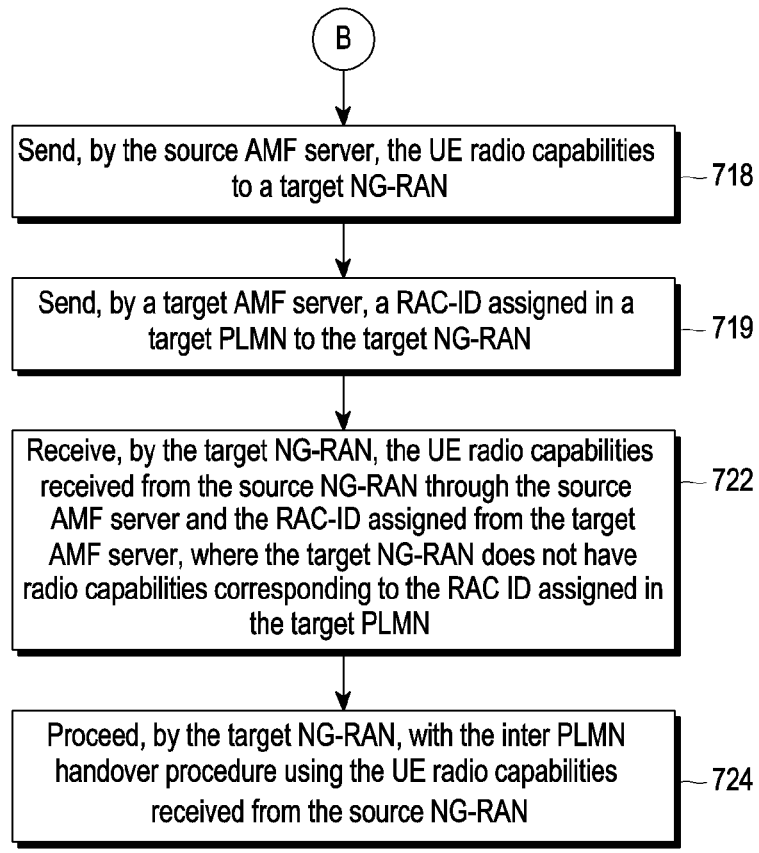

[Fig. 7d]
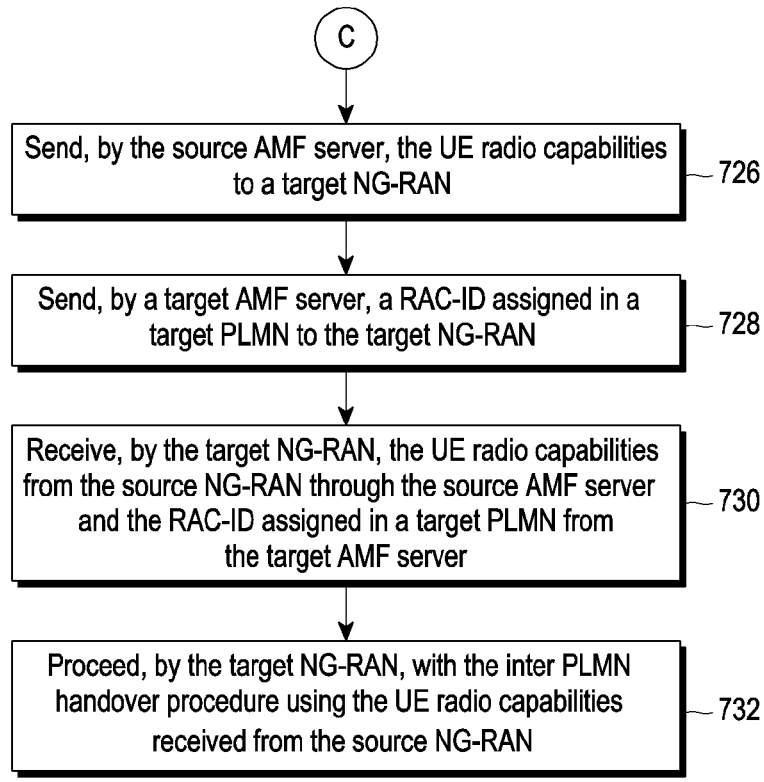
[Fig. 7e]
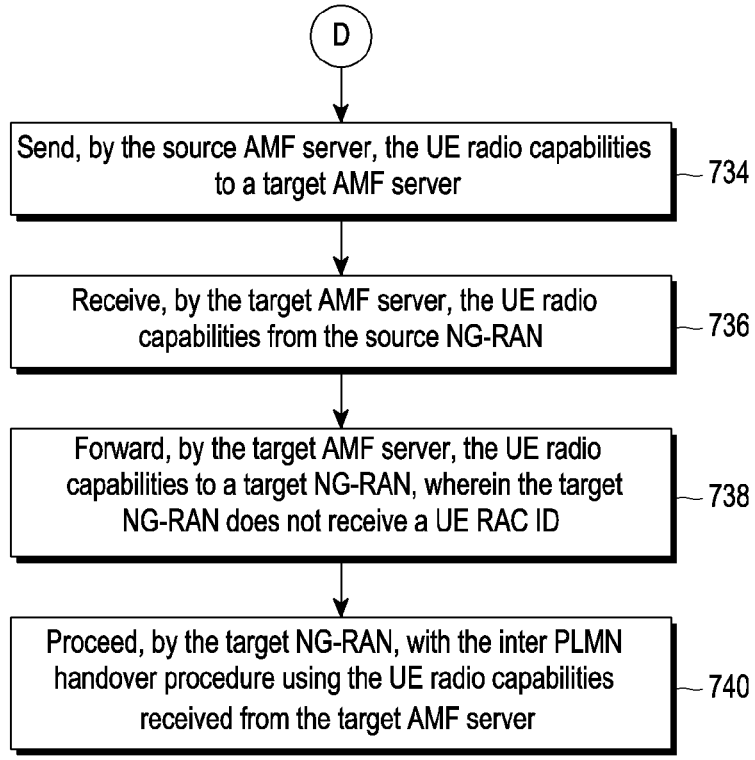

[Fig. 8]
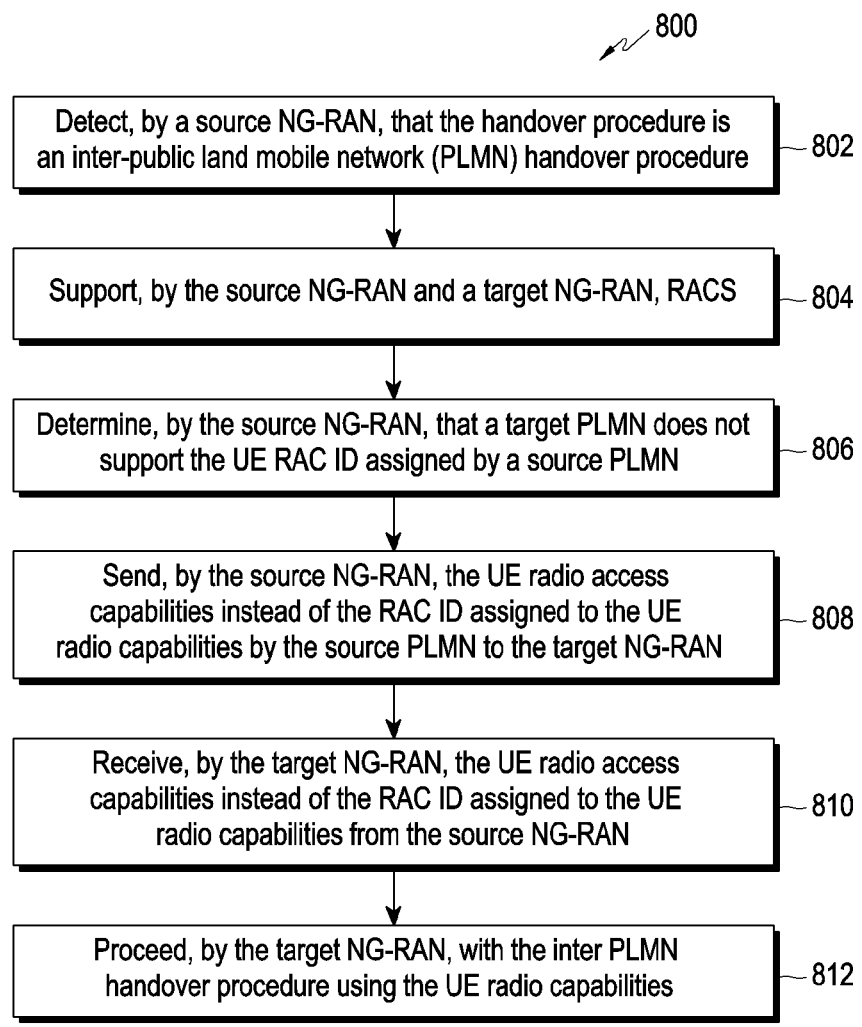

METHOD AND APPARATUS FOR PROVIDING UE RADIO CAPABILITIES IN HANDOVER PROCEDURE

PRIORITY

This application is a National Phase Entry of PCT International Application No. PCT/KR2020/013301, which was filed on Sep. 29, 2020 and claims priority to Indian Patent Application Nos. 201941040399 (PS) and 201941040399 (CS), which were filed on Oct. 4, 2019 and Sep. 24, 2020, respectively, the content of each of which is incorporated herein by reference.

TECHNICAL FIELD

This disclosure defines a method and an apparatus for providing User Equipment (UE) radio capability identifier (ID) in a Public Land Mobile Network (PLMN). More specifically, a method and an apparatus for providing the UE radio capability ID in an inter-PLMN handover procedure.

BACKGROUND ART

In a wireless communication network, various issues are encountered during an inter-PLMN handover especially related to handling of a UE radio capability ID. According to 3rd Generation Partnership Project (3GPP) technical specification (TS) 23.501 and TS 23.502, specification, a UE is assigned the UE radio capability ID for a set of radio capabilities by the wireless communication network. The UE shall send the radio capability ID in a registration request message to the wireless communication network. The wireless communication network will download the corresponding set of radio capabilities and use the set of radio capabilities in an access stratum (AS) and a non-access stratum (NAS) procedure. The radio capability ID assigned by the PLMN is local to the PLMN. This assigned radio capability ID cannot be used in any other PLMN.

DISCLOSURE OF INVENTION

Technical Problem

In the inter-PLMN handover scenario, a source new radio (NG) Radio Access Network (NG-RAN) includes the UE radio capability ID in a source to target transparent container in a handover required message, a target PLMN sends a handover request containing the source to target transparent container to a target NG-RAN. The target NG-RAN in this case cannot map the UE radio capability ID to the set of radio capabilities as the target NG-RAN may not understand the UE radio capability ID assigned by a source PLMN. This will lead to failure in the handover procedure which needs to be addressed.

Further, due to some network operation and management procedure, a UE radio Capability Management Function (UCMF) may assign a different UE radio capability ID for the set of radio capabilities. The UCMF may associate a different set of UE radio capabilities to a first UE radio capability ID. If the UE switched on after long time and uses the first UE radio capability ID, then in this scenario the wireless communication network will use different set of radio capabilities for the UE. This may lead to undeterministic behavior in the UE and the wireless communication network which will impact the AS and NAS procedure, which needs to be addressed.

Further, the UE may be assigned multiple UE radio capability IDs for the different set of UE radio capabilities by the UCMF. There is possibilities that the UE radio capability IDs are re-assigned to different set of UE radio capabilities by the UCMF. In this scenario, the wireless communication network re-assign the UE radio capability ID for a current UE radio capability ID used. The wireless communication network has no idea that it has assigned other UE radio capabilities ID to the UE. The other UE radio capability ID(s) are not updated in this case. This will bring un-deterministic behavior in the wireless communication network for the UE. This will impact a services provided to a user which needs to be addressed.

Thus, it is desired to address the above mentioned disadvantages or other shortcomings or at least provide a useful alternative.

Solution to Problem

An embodiment of the disclosure is to provide a method and an apparatus for providing UE radio capabilities in a handover procedure by sending a UE radio capabilities instead of RAC ID assigned to the UE radio capabilities by a source PLMN in a source to target transparent container information element to a source AMF server from a source NG-RAN in response to detecting that the handover procedure is a PLMN handover procedure. This results in reducing the resource wastage in a wireless communication network.

Accordingly, the embodiments herein disclose a method for providing user equipment (UE) radio access capabilities in a handover procedure. The method includes identifying, by a source next-generation radio access network (NG-RAN), that a target public land mobile network (PLMN) does not support a UE radio access capabilities identifier (RAC ID) assigned by a source PLMN in an inter-PLMN handover procedure. Further, the method includes providing, by the source NG-RAN, to a target NG-RAN, the UE radio access capabilities instead of the UE RAC ID in response to identifying that the target PLMN does not support the UE RAC ID assigned by the source PLMN.

Accordingly, the embodiments herein disclose a source next-generation radio access network (NG-RAN) for transmitting user equipment (UE) radio capabilities in a handover procedure. The source NG-RAN includes a transceiver and at least one processor. The at least one processor is configured to identify that a target public land mobile network (PLMN) does not support a UE radio access capabilities identifier (RAC ID) assigned by a source PLMN in an inter-PLMN handover procedure, and control the transceiver to provide, to a target NG-RAN, the UE radio access capabilities instead of the UE RAC ID in response to identifying that the second PLMN does not support the UE RAC ID assigned by the first PLMN.

Accordingly, the embodiments herein disclose a method for handling UE radio access capabilities during a handover procedure. The method includes detecting, by a source NG-RAN, that the handover procedure is a PLMN handover procedure, when the source NG-RAN and a target NG-RAN support Radio Capabilities Signaling Optimization (RACS). Further, the method includes determining, by the source NG-RAN, that a target PLMN does not support the UE RAC ID assigned by a source PLMN. Further, the method includes sending, by the source NG-RAN, the UE radio access capabilities instead of the RAC ID assigned to the UE radio capabilities by the source PLMN to the target NG- RAN in response to determining that the target PLMN does not support the UE RAC ID assigned by the source PLMN.

In an embodiment, the method includes receiving, by the target NG-RAN, the UE radio access capabilities instead of the RAC ID assigned to the UE radio capabilities from the source NG-RAN. Further, the method includes proceeding, by the target NG-RAN, with the inter PLMN handover procedure using the UE radio capabilities.

Accordingly, the embodiments herein disclose a wireless communication network for handling UE radio capabilities during a handover procedure. The wireless communication network includes a source NG-RAN and a target NG-RAN. The source NG-RAN is configured to detect that the handover procedure is an inter-public land mobile network (PLMN) handover procedure, when the source NG-RAN and a target NG-RAN support Radio Capabilities Signaling Optimization (RACS). The source NG-RAN and a target NG-RAN support RACS. The source NG-RAN is configured to determine that a target PLMN does not support the UE RAC ID assigned by a source PLMN, and send the UE radio access capabilities instead of the RAC ID assigned to the UE radio capabilities by the source PLMN to the target NG-RAN in response to determining that the target PLMN does not support the UE RAC ID assigned by the source PLMN.

Accordingly, the embodiments herein disclose a method for handling UE radio capabilities during a handover procedure. The method includes detecting, by a source NG-RAN, that the handover procedure is an inter-PLMN handover procedure. Further, the method includes sending, by the source NG-RAN, the UE radio capabilities instead of RAC ID assigned to the UE radio capabilities by a source PLMN in a source to target transparent container information element to a source AMF server in response to detecting that the handover procedure is the PLMN handover procedure.

In an embodiment, the method further includes sending, by the source AMF server, the UE radio capabilities to a target AMF server. Further, the method includes receiving, by the target AMF server, the UE radio capabilities from the source AMF server. Further, the method includes forwarding, by the target AMF server, the UE radio capabilities to a target NG-RAN. Further, the method includes proceeding, by the target NG-RAN, with the inter PLMN handover procedure using the UE radio capabilities received from the target AMF server.

In an embodiment, the method further includes sending, by the source AMF server, the UE radio capabilities to the target NG-RAN. Further, the method includes sending, by a target AMF server, a RAC-ID assigned in a target PLMN to the target NG-RAN. Further, the method includes receiving, by the target NG-RAN, the UE radio capabilities received from the source NG-RAN through the source AMF server and the RAC-ID assigned from the target AMF server, where the target NG-RAN does not have radio capabilities corresponding to the RAC ID assigned in the target PLMN. Further, the method includes proceeding, by the target NG-RAN, with the inter PLMN handover procedure using the UE radio capabilities received from the source NG-RAN.

In an embodiment, the method further includes sending, by the source AMF server, the UE radio capabilities to the target NG-RAN. Further, the method includes sending, by the target AMF server, a RAC-ID assigned in the target PLMN to the target NG-RAN. Further, the method includes receiving, by the target NG-RAN, the UE radio capabilities from the source NG-RAN through the source AMF server and the RAC-ID assigned in a target PLMN from the target AMF server. Further, the method includes proceeding, by the target NG-RAN, with the inter PLMN handover procedure using the UE radio capabilities received from the source NG-RAN.

In an embodiment, sending, by the source NG-RAN, the UE radio capabilities instead of the RAC ID assigned to the UE radio capabilities by a source PLMN in the source to target transparent container information element includes determining, by the source NG-RAN, that a target PLMN does not support the UE RAC ID assigned by the source PLMN based on a local configuration, and sending, by the source NG-RAN, the UE radio capabilities instead of the RAC ID assigned to the UE radio capabilities by the source PLMN in the source to target transparent container information element in response to determining that the target PLMN does not support the UE RAC ID assigned by the source PLMN based on the local configuration.

In an embodiment, sending, by the source NG-RAN, the UE radio capabilities instead of the RAC ID assigned to the UE radio capabilities by a source PLMN in the source to target transparent container information element includes determining, by the source NG-RAN, that a target PLMN does not support the UE RAC ID assigned by the source PLMN based on a local configuration, supporting, by the source NG-RAN and the target NG-RAN, Radio Capabilities Signaling Optimization (RACS), and sending, by the source NG-RAN, the UE radio capabilities instead of the RAC ID assigned to the UE radio capabilities by the source PLMN in the source to target transparent container information element in response to determining that the target PLMN does not support the UE RAC ID assigned by the source PLMN based on the local configuration and supporting the RACS.

In an embodiment, the method further includes sending, by the source AMF server, the UE radio capabilities to a target AMF server. Further, the method includes receiving, by the target AMF server, the UE radio capabilities from the source NG-RAN. Further, the method includes forwarding, by the target AMF server, the UE radio capabilities to a target NG-RAN, wherein the target NG-RAN does not receive the UE RAC ID. Further, the method includes proceeding, by the target NG-RAN, with the inter PLMN handover procedure using the UE radio capabilities received from the target AMF server.

Accordingly, the embodiments herein disclose a wireless communication network for handling UE radio capabilities during a handover procedure. The system includes a source NG-RAN configured to detect that the handover procedure is an inter-PLMN handover procedure. Further, the source NG-RAN is configured to send the UE radio capabilities instead of RAC ID assigned to the UE radio capabilities by a source PLMN in a source to target transparent container information element to a source AMF server in response to detecting that the handover procedure is the PLMN handover procedure.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This method and wireless communication network are illustrated in the accompanying drawings, throughout which like reference letters indicate corresponding parts in the various figures. The embodiments herein will be better understood from the following description with reference to the drawings, in which:

FIG. 6a illustrates various hardware components of the source NG-RAN, according to an embodiment of the disclosure;

FIG. 6b illustrates various hardware components of a target NG-RAN, according to an embodiment of the disclosure;

FIG. 6c illustrates various hardware components of a source AMF server, according to an embodiment of the disclosure;

FIG. 6d illustrates various hardware components of a target AMF server, according to an embodiment of the disclosure;

FIG. 7a is a flow chart illustrating a method for handling UE radio capabilities during the handover procedure, according to an embodiment of the disclosure;

FIG. 7b is a flow chart illustrating a method for proceeding the handover procedure, according to an embodiment of the disclosure;

FIG. 7c is a flow chart illustrating a method for proceeding the handover procedure, according to an embodiment of the disclosure;

FIG. 7d is a flow chart illustrating a method for proceeding the handover procedure, according to an embodiment of the disclosure;

FIG. 7e is a flow chart illustrating a method for proceeding the handover procedure, according to an embodiment of the disclosure; and FIG. 8 is another flow chart illustrating a method for handling UE radio access capabilities during a handover procedure, according to an embodiment of the disclosure.

MODE FOR THE INVENTION

Figure 1:
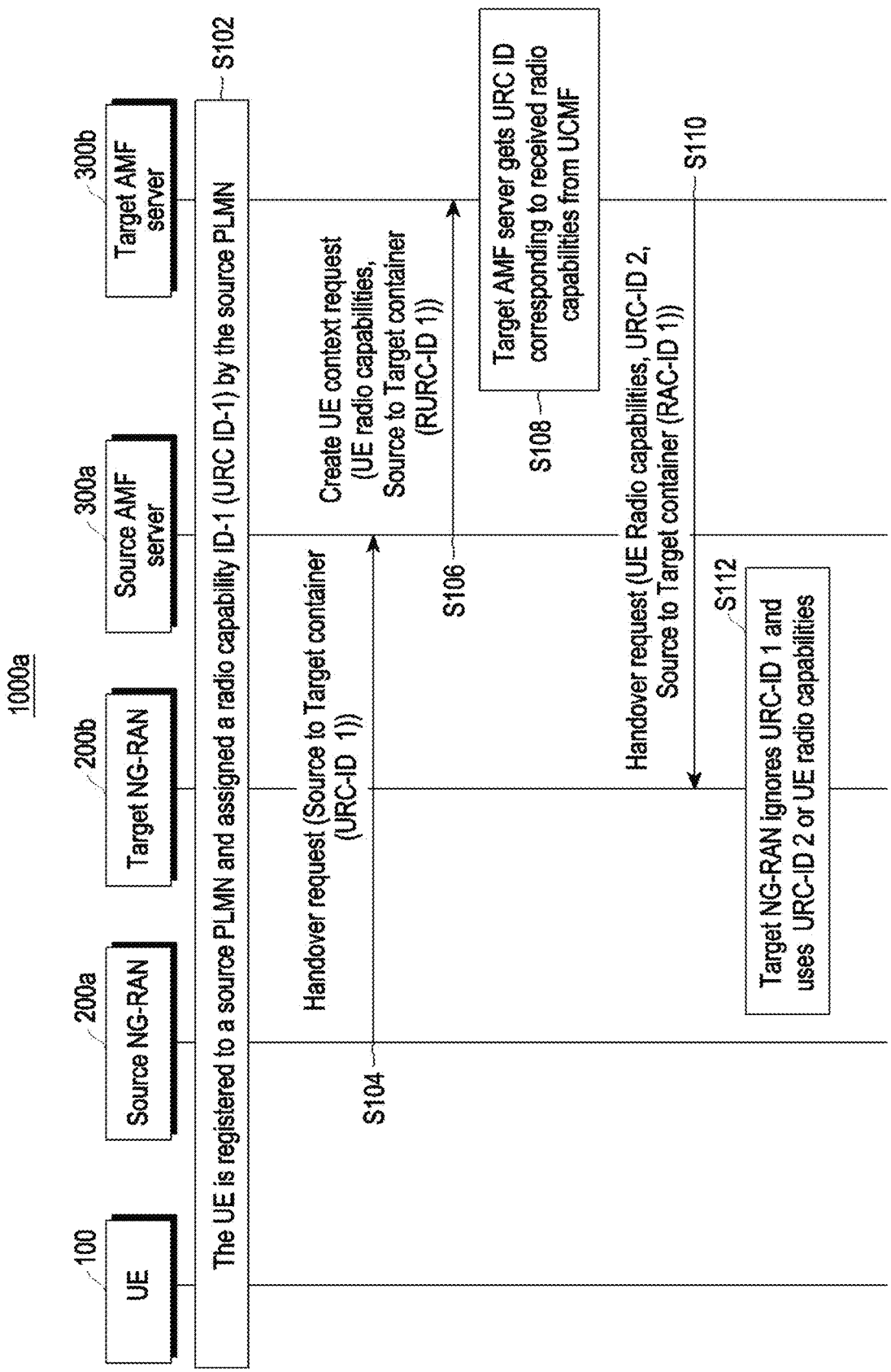
FIG. 1 is a sequential diagram illustrating step by step operations for initiation of a handover procedure between a source NG RAN and a cell of a PLMN, according to the embodiments of the disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein disclose a method for handling UE radio access capabilities during a handover procedure. The method includes detecting, by a source NG-RAN, that the handover procedure is a PLMN handover procedure, when the source NG-RAN and a target NG-RAN support RACS. Further, the method includes determining, by the source NG-RAN, that a target PLMN does not support the UE RAC ID assigned by a source PLMN. Further, the method includes sending, by the source NG-RAN, the UE radio access capabilities instead of the RAC ID assigned to the UE radio capabilities by the source PLMN to the target NG-RAN in response to determining that the target PLMN does not support the UE RAC ID assigned by the source PLMN.

The method can be used for handling UE radio capabilities during a handover procedure by sending a UE radio capabilities instead of RAC ID assigned to the UE radio capabilities by a source PLMN in a source to target transparent container information element to a source AMF server from a source NG-RAN in response to detecting that the handover procedure is a PLMN handover procedure. This results in reducing the resource wastage in a wireless communication network.

Various embodiments of this disclosure is adopted in 3GPP TS 23.501 v16.5.0.

Referring now to the drawings, and more particularly to FIGS. 1 through 8, where similar reference characters denote corresponding features consistently throughout the figures, there are shown preferred embodiments.

FIG. 1 is a sequential diagram illustrating step by step operations for initiation of a handover procedure between a source NG RAN (200a) and a cell of a target PLMN, according to an embodiment of the disclosure.

Consider a conventional scenario, where the UE (100) is assigned a UE radio capability ID for a set of radio capabilities by a wireless communication network (1000a-1000e). Hereafter, the label of the wireless communication network is 1000. The UE (100) shall send the UE radio capability ID in a registration request message to the wireless communication network (1000). The wireless communication network will download the corresponding set of radio capabilities and use the UE radio capability ID in an AS procedure and a NAS procedure. The radio capability ID assigned by a PLMN is local to the PLMN. This assigned radio capability ID cannot be used in the other PLMN. In an inter-PLMN handover case, a source NG-RAN (200a) includes the UE radio capability ID in a source to target transparent container in a handover required message, the target PLMN sends handover request containing the source to target transparent container to a target NG-RAN (200b). The target NG-RAN (200b) in this case cannot map the UE radio capability ID to the set of radio capabilities as the target NG-RAN (200b) may not understand the UE radio capability ID assigned by a source PLMN. This will lead to failure in handover procedure.

The above problem is addressed in the proposed method, referring to the FIG. 1, at S102, the UE (100) is registered to a first PLMN and has been assigned the UE Radio Capability ID 1 (URC ID 1) for a set of UE radio capabilities. The UE (100) is in a 5GS Mobility Management (5GMM) connected state. A handover criteria to a cell of second PLMN has been met. At S104, the source NG-RAN (200a) initiates a handover to a cell of the second PLMN. The source NG-RAN (200a) includes the URC ID 1 in a source to target transparent container and sends a first message (e.g. HANDOVER REQUIRED message) containing the source to target transparent container to a source AMF server (300a) of the first PLMN requesting the source AMF server (300a) to prepare resources at a target side. The first message may contain other parameter(s).

At S106, in case of an inter-PLMN handover, the source AMF server (300a) includes the set of UE radio capabilities corresponding to the URC ID 1 or URC ID 1 or both URC ID 1 and the set of UE radio capabilities, and the source to target transparent container in a second message (i.e., Namf_Communication_CreateUEContext Request) from the source AMF server (300a) to the target AMF server (300b) of the second PLMN. The message may contain other parameter(s) as well.

At S108, in case of inter-PLMN handover, the target AMF server (300b) fetches a UE Radio Capability ID 2 (URC ID 2) corresponding to the set of radio access capabilities received in the second message from the UCMF.

At S110, the target AMF server (300b) includes the first set of UE radio capabilities or the URC ID 2 or both URC ID 2 and the first set of UE radio capabilities, and the source to target transparent container in a third message (e.g. HANDOVER REQUEST) to the target NG-RAN (200b). The target NG-RAN (200b) on receiving the third message (e.g. HANDOVER REQUEST) ignores the URC ID 1 included in the source to transparent container and proceeds the handover procedure using the set of UE radio access capabilities received in the third message.

At S112, if the URC ID-2 is included and the set of radio capabilities is not included in the third message, the target RAN (200b) shall request the target AMF server (200b) to provide the UE radio capabilities set corresponding to the UE Radio Capability ID to the target RAN (200b) if there is no mapping of UE Radio Capability ID to the UE radio capabilities set present at the target NG-RAN (200b). The target RAN (200b) uses the set of UE radio capabilities received from the target AMF server (300b) and ignores the URC-ID 1 included in the Source to Target transparent container.

The target NG-RAN (200b) may store the mapping of URC ID 2 and the set of UE radio capabilities. The target NG-RAN (200b) may use the URC ID 2 for the set of UE radio capabilities.

Figure 2:
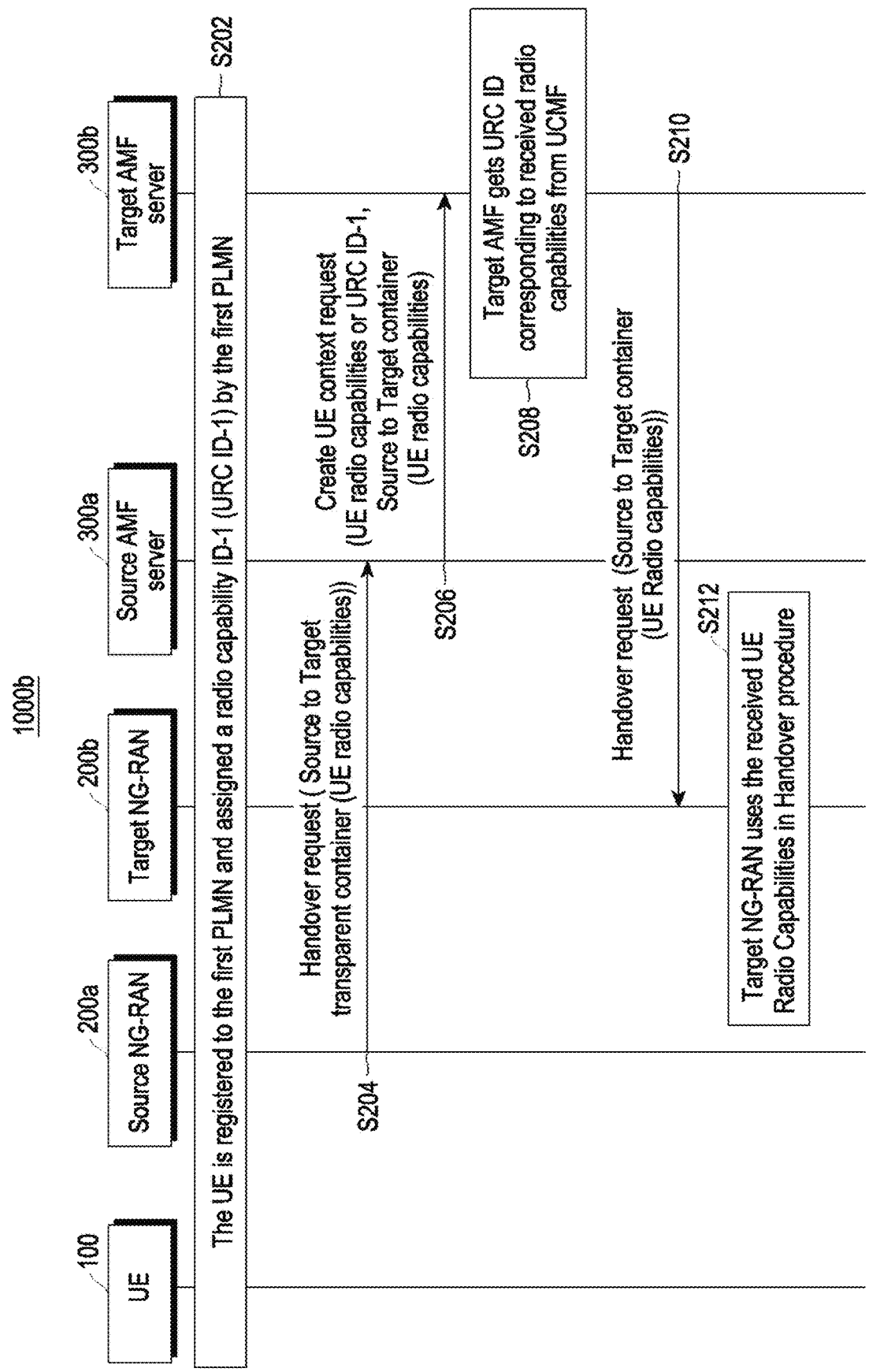
FIG. 2 is a sequential diagram illustrating step by step operations for determining of a source NG-RAN, that the cell belongs to a PLMN (i.e., target PLMN) and the source NG-RAN includes a set of UE radio capabilities in a source to target transparent container, according to embodiments of the disclosure.

FIG. 2 is a sequential diagram illustrating step by step operations for determining of the source NG-RAN (200a), that the cell belongs to other PLMN (i.e., second PLMN) and the source NG-RAN (200a) includes the set of UE radio capabilities in the source to target transparent container, according to the embodiments of the disclosure.

Consider a conventional scenario where the current 3GPP TS 23.501 and TS 23.502, specification, the UE (100) is assigned the UE radio capability ID for the set of radio capabilities by the wireless communication network (1000). The UE (100) shall send the radio capability ID in the registration request message to the wireless communication network (1000). The wireless communication network (1000) will download the corresponding set of radio capabilities and use the set of radio capabilities in the AS and the NAS procedure. The radio capability ID assigned by the PLMN is local to the PLMN. This assigned radio capability ID cannot be used in the other PLMN. In the inter-PLMN handover case, the source NG-RAN (200a) includes the UE radio capability ID in the source to target transparent container in the handover required message, the target PLMN sends a handover request containing the source to target transparent container to the target NG-RAN (200b). The target NG-RAN (200b) in this case cannot map the UE radio capability ID to the set of radio capabilities as the target NG-RAN (200b) may not understand the UE radio capability ID assigned by the source PLMN. This will lead to failure in the handover procedure.

The above problem is addressed in the proposed method as the UE (100) is registered to the first PLMN and has been assigned the URC ID 1 for a set of UE radio capabilities.

At S202, the UE (100) is in the 5GMM-CONNECTED state. The handover criteria to the cell of the second PLMN has met. The source NG-RAN (200a) initiate the handover to the cell of the second PLMN. The source NG-RAN (200a) determines that the cell belongs to other PLMN (i.e., second PLMN) then the source NG-RAN (200a) includes the set of UE radio capabilities in the source to target transparent container. If the source NG-RAN (200a) determines that the target cell belongs to the first PLMN then the source NG-RAN (200a) includes URC ID 1 in the source to target transparent container. At S204, the source NG-RAN (200a) sends the first message (e.g. handover required message) containing the source to target transparent container to the source AMF server (300a) of the first PLMN requesting the source AMF server (300a) to prepare resources at the target side. The first message may contain other parameter(s).

At S206, the source AMF server (300a) includes the set of UE radio capabilities corresponding to the URC ID 1 or URC ID 1 or both the set of UE radio capabilities corresponding to the URC ID 1, and the source to target transparent container in a second message (i.e., Namf_Communication_CreateUEContext Request) from the source AMF server (300*a*) to the target AMF server (300*b*) of the second PLMN. The message may contain other parameter(s).

At S208, if the second message contains the set of UE radio capabilities then the target AMF server (300*b*) fetches the URC ID 2 corresponding to the set of radio access capabilities received in the second message from the UCMF.

At S210, in case of the inter-PLMN handover, the target AMF server (300*b*) includes the source to target transparent container and may include the set of UE radio capabilities or URC ID 2 or both URC ID 2 in a third message (e.g. handover request message). The target AMF server (300*b*) may also include other parameter(s).

Upon receiving the third message (e.g. handover request message), the target NG-RAN (200*b*) performs following actions:
  i. If the third message does not contain the URC ID 2 and the set of UE radio capabilities, the target NG-RAN (200*b*) proceeds with handover procedure to the cell of second PLMN using the set of UE radio capabilities received in the source to target transparent container Information Element (IE).
  ii. If the third message contains the URC ID 2 and does not contain the set of UE radio capabilities, the target NG-RAN (200*b*) proceeds with the handover procedure to the cell of second PLMN using the set of radio capabilities received in the source to target transparent container IE. The target NG-RAN (200*b*) may store mapping of URC ID 2 and the set of UE radio capabilities. The target NG-RAN (200*b*) uses the URC ID 2 for the set of UE radio capabilities in the AS or NAS or other procedure.
  iii. If the third message contains the set of UE radio capabilities and does not contain URC ID 2 then the target NG-RAN (200*b*) compares of the set of UE radio capabilities received in the third message and the set of UE radio capabilities in the source to target transparent container are same then the target NG-RAN (200*b*) user either of set of UE radio access capabilities otherwise the target RAN (200*b*) aborts the handover procedure. In one example if the set of the UE radio capabilities are different than the target NG-RAN (200*b*) uses the set of the UE radio capabilities sent in the third message.
  iv. If the third message contains both the set of UE radio capabilities and URC-ID 2, then the UE (100) stores the mapping od URC-ID 2 and the set of UE radio capabilities. The UE (100) executes procedure as defined in step iii).

Figure 3:
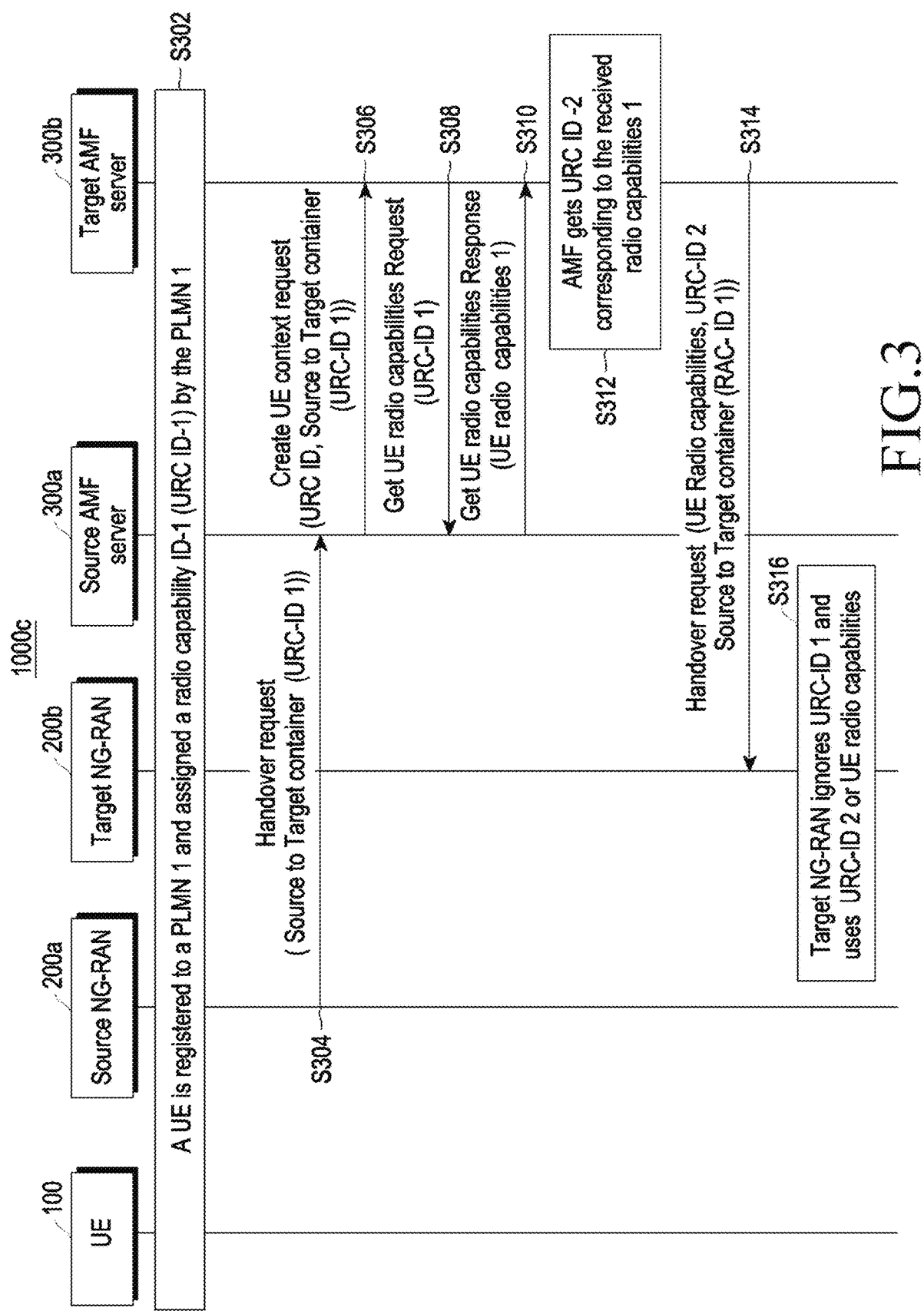
FIG. 3 is a sequential diagram illustrating step by step operations for registration between a UE and a first PLMN and assignment of a UE Radio Capability ID 1 (URC ID 1) for a set of the UE radio capabilities, according to embodiments of the disclosure.

FIG. 3 is a sequential diagram illustrating step by step operations for registration between the UE (100) and the first PLMN and assignment of URC ID 1 for the set of UE radio capabilities, according to the embodiments of the disclosure.

Consider a conventional scenario where the current 3GPP TS 23.501 and TS 23.502 specification, the UE (100) is assigned the UE radio capability ID for the set of radio capabilities by the network (1000). The UE (100) shall send the radio capability ID in the registration request message to the network (1000). The network (1000) will download the corresponding set of radio capabilities and use the set of radio capabilities in the AS and NAS procedure. The radio capability ID assigned by the PLMN is local to the PLMN. This assigned radio capability ID cannot be used in the other PLMN. In the inter-PLMN handover case, the source NG-RAN (200*a*) includes the UE radio capability ID in the source to target transparent container in the handover required message, the target PLMN sends the handover request containing the source to target transparent container to the target NG-RAN (200*b*). The target NG-RAN (200*b*) in this case cannot map the UE radio capability ID to the set of radio capabilities as the target NG-RAN (200*b*) may not understand the UE radio capability ID assigned by the source PLMN. This will lead to failure in handover procedure.

The above problem is addressed in the proposed method, as shown in the FIG. 3, as the UE (100) is registered to the first PLMN and has been assigned the URC ID 1 for the set of UE radio capabilities.

At S302, the UE (100) is in the 5GMM-connected state. The handover criteria to the cell of the second PLMN has met. The source NG-RAN (200*a*) initiates handover to the cell of the second PLMN. The source NG-RAN (200*a*) includes the URC ID 1 in the source to target transparent container. At S304, the source NG-RAN (200*a*) sends the first message (e.g. handover required message) containing the source to target transparent container to the source AMF server (300*a*) of the first PLMN requesting the target AMF server (300*b*) to prepare resources at the target side. The first message may contain other parameter(s).

At S306, the source AMF server (300*a*) includes the URC ID 1, and the source to target transparent container in the second message (Namf_Communication_CreateUEContext Request) from the source AMF server (300*a*) to the target AMF server (300*b*) of the PLMN 2. The message may contain other parameter(s).

Upon receiving the second message, the target AMF server (300*b*) determines if support URC ID of the first PLMN. At S308, if the URC ID of the first PLMN is not supported than the target AMF server (300*b*) sends the third message requesting the source AMF server (300*a*) to provide the set of UE radio capabilities of the UE (100). The target AMF server (300*b*) may include the URC ID 1 in the third message.

At S310, the source AMF server (300*a*) provides the set of UE radio capabilities corresponding to the URC ID 1 to the target AMF server (300*b*) in a forth message. At S312, the target AMF server (300*b*) may get URC ID (URC ID 2) for the received set of UE radio capabilities from the UCMF.

At S314, the target AMF server (300*b*) includes the source to target transparent container and includes the set of UE radio capabilities or URC ID 2 or both URC ID 2 in a fifth message (e.g. HANDOVER REQUEST). The target AMF may also include other parameter(s).

At S316, upon receiving the fifth message (e.g. HANDOVER REQUEST), the target NG-RAN (200*b*) performs following actions:
  i. If the fifth message does not contain URC ID 2 and the set of UE radio capabilities, the target NG-RAN (200*b*) and the target NG-RAN (200*b*) determines that the source cell belongs to the first PLMN then the target NG-RAN (200*b*) aborts the handover procedure and sends handover failure message to the target AMF server (300*b*).
  ii. If the fifth message contains the URC ID 2 and does not contain the set of UE radio capabilities, the target NG-RAN (200*b*) ignores the URC ID 1 present in the source to target transparent container. The target NG-RAN (200*b*) gets the set of UE radio capabilities corresponding to the URC ID 2 from the target AMF server (300*b*) and proceeds with the handover procedure using the received set of UE Radio capabilities. The target NG-RAN (200*b*) may store mapping of URC ID 2 and the set of UE radio capabilities. The target NG-RAN (200b) uses the URC ID 2 for the set of UE radio capabilities in AS or NAS or other procedure.

iii. If the fifth message contains the set of UE radio capabilities and does not contain URC ID 2 then the target NG-RAN (200b) proceeds with the handover procedure using the set of UE radio capabilities received in the fifth message. The target RAN (200b) ignores the URC ID 1 present in the source to target transparent container.

iv. If the third message contains both the set of UE radio capabilities and URC ID 2, then the UE (100) stores the mapping of URC ID 2 and the set of UE radio capabilities. The UE (100) executes procedure as defined in step iii).

In one embodiment, all the procedure defined in the FIG. 1, FIG. 2 and FIG. 3 also apply for same PLMN handover case i.e. source cell and target cell belongs to same PLMN.

Figure 4:
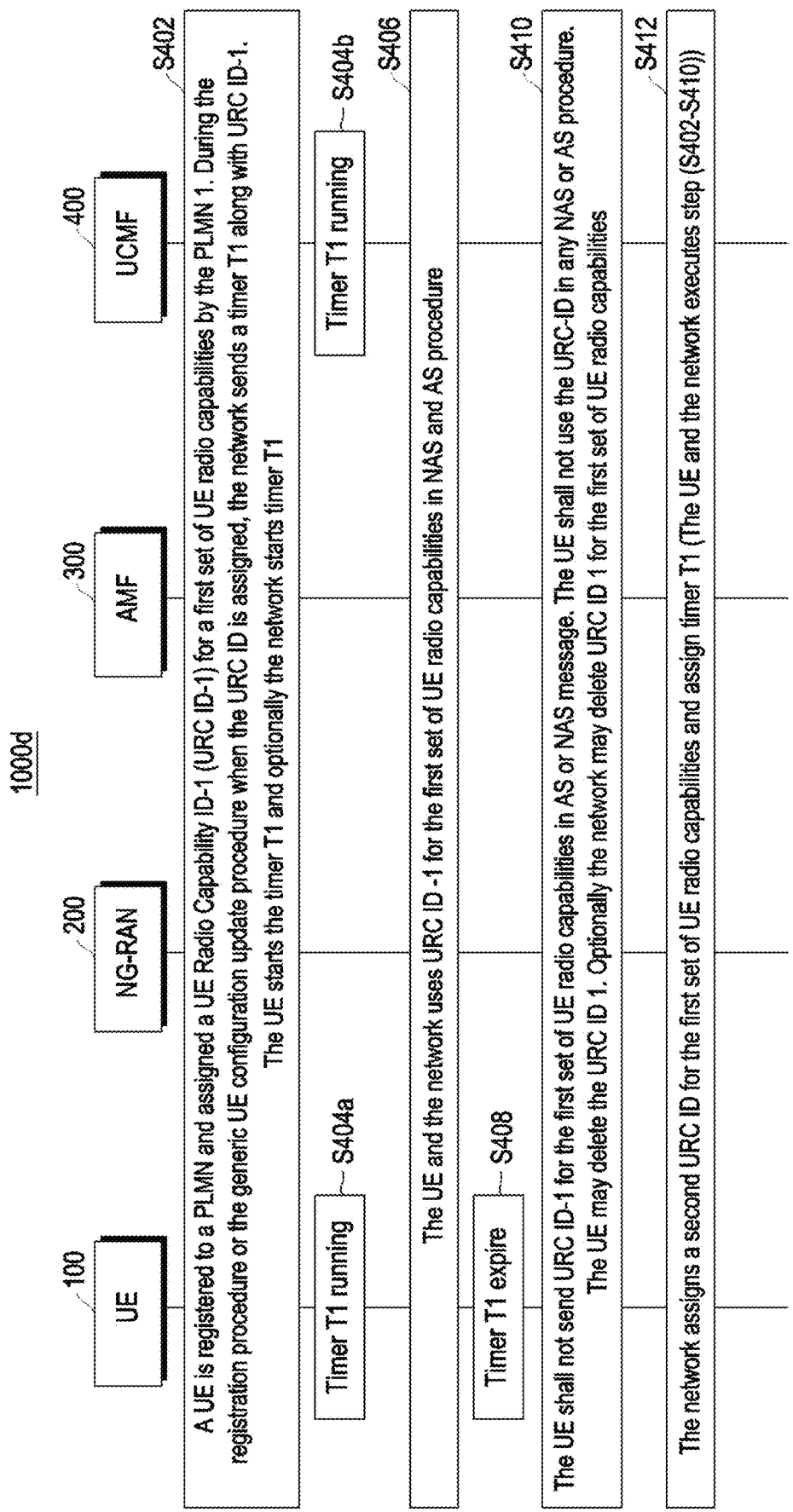
FIG. 4 is a sequential diagram illustrating step by step operations for registration or a generic UE configuration update procedure, when the URC ID is assigned when a wireless communication network sends a timer T1 along with URC ID-1 to the UE, according to an embodiment of the disclosure.

FIG. 4 is a sequential diagram illustrating step by step operations for registration or the generic UE configuration update procedure, when the URC ID is assigned, the network (100) sends a timer T1 along with URC ID-1 to the UE (100), according to an embodiment of the disclosure.

Referring FIG. 4, consider a conventional scenario where the current 3GPP TS 23.501 and TS 23.502, specification, the UE (100) is assigned the UE radio capability ID for the set of radio capabilities by the network (UCMF). The UE (100) shall send the radio capability ID in the registration request message to the network (1000). The network (1000) will download the corresponding set of radio capabilities and use it in AS and NAS procedure. The radio capability ID assigned by the PLMN is local to the PLMN. This assigned radio capability ID cannot be used in the other PLMN. Due to some network operation and management procedure the UCMF (400) may assign a different UE radio capability ID for the set of radio capabilities. The UCMF (400) may associate a different set of UE radio capabilities to the first UE radio capability ID. If the UE (100) switched on after long time and uses the first UE radio capability ID, then in this scenario the network (1000) will use different set of radio capabilities for the UE. This may lead to un-deterministic behavior in the UE (100) and the network (1000) which will impact the AS and NAS procedure.

The above problem is addressed in the proposed method, as shown in the FIG. 4. At S402, the UE (100) is registered to a PLMN and assigned the URC ID-1 for a first set of UE radio capabilities by the first PLMN. During the registration procedure or the generic UE configuration update procedure when the URC ID is assigned, the network (1000) sends a timer T1 along with URC ID-1. At S404a and S404b, the UE (100) starts the timer T1 and optionally the network starts timer T1.

At S406, while, timer T1 is running the UE (100) uses the URC ID 1 for the first set of UE radio capabilities. At S408, after, the timer T1 expires, the UE (100) shall not send URC ID-1 for the first set of UE radio capabilities in the AS or NAS message. The UE (100) shall not use the URC-ID in any NAS or AS procedure. The UE (100) may delete the URC ID 1 (as shown in S410). Optionally the network may delete URC ID 1 for the first set of UE radio capabilities.

The network assigns a second URC ID for the first set of UE radio capabilities and assign timer T1. The UE (100) and the network (1000) executes step S402-S410.

Figure 5:
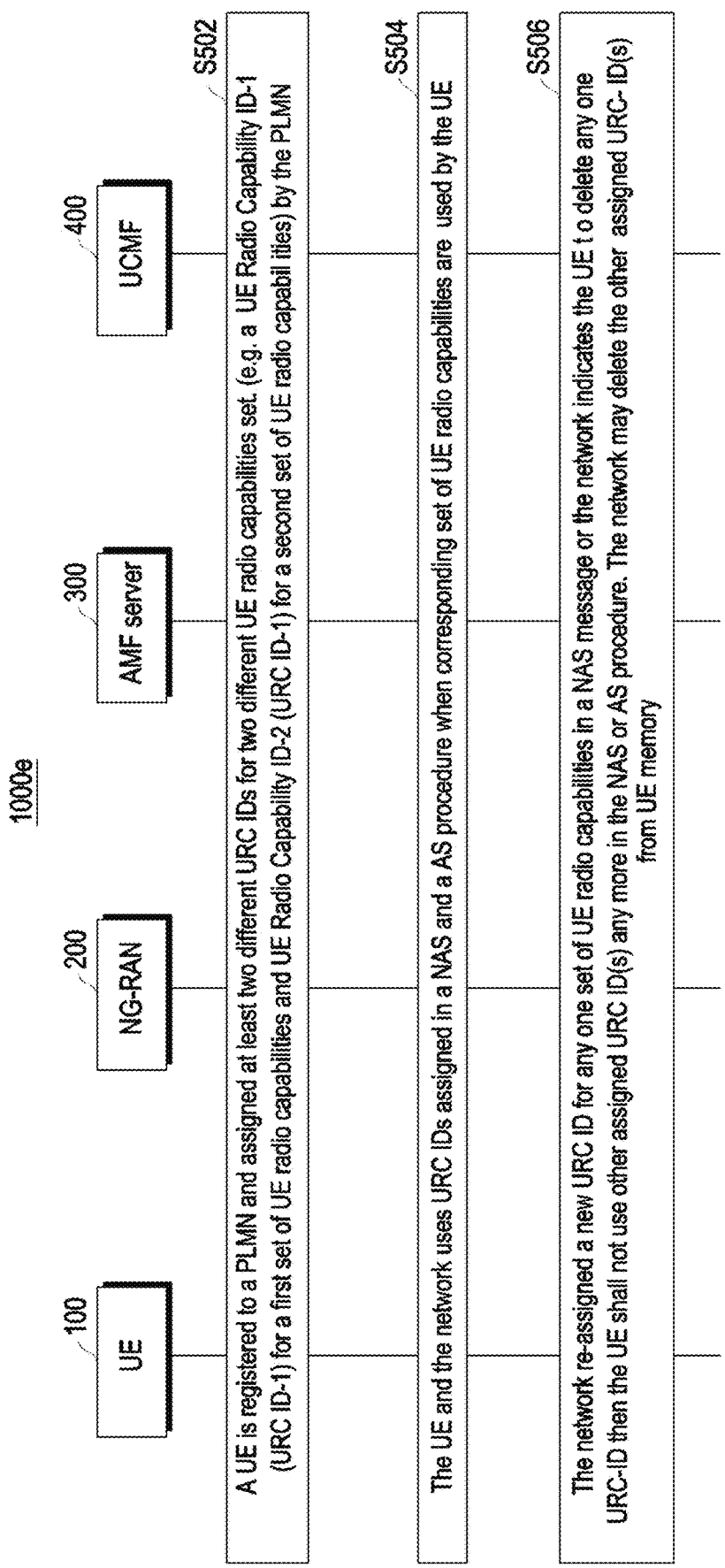
FIG. 5 is a sequential diagram illustrating step by step operations for addressing a wireless communication network re-assignment of the UE radio capability ID for the current UE radio capability ID used without updating the other UE radio capability ID(s), according to an embodiment of the disclosure.

FIG. 5 is a sequential diagram illustrating step by step operations for addressing the network re-assignment of the UE radio capability ID for the current UE radio capability ID used without updating the other UE radio capability ID(s), according to an embodiment of the disclosure.

Referring to the FIG. 5, consider a conventional scenario where the UE (100) may be assigned multiple UE radio capability IDs for the different set of UE radio capabilities by the UCMF (400). There is possibilities that the UE radio capability IDs are reassigned to different set of UE radio capabilities by the UCMF (4000). In this scenario, the network (1000) re-assign the UE radio capability ID for the current UE radio capability ID used. The network (1000) has no idea that it has assigned other UE radio capabilities ID to the UE. The other UE radio capability ID(s) are not updated in this case. This will bring un-deterministic behavior in the network (1000) for the UE (100). This will impact the services provided to the user.

The above problem is addressed in the proposed method, as shown in the FIG. 5, at S502, the UE (100) which is registered to the PLMN is assigned at least two different UE Radio Capabilities IDs for two different UE radio capabilities set. (e.g. a UE Radio Capability ID-1 (URC ID-1) for a first set of UE radio capabilities and UE Radio Capability ID-2 (URC ID-1) for a second set of UE radio capabilities) by the PLMN.

At S504, the UE (100) and the network uses URC IDs assigned in the NAS and the AS procedure when corresponding set of UE radio capabilities are used by the UE (100). At S506, the network (1000) re-assigned a new URC ID for any one set of UE radio capabilities in the NAS message or the network indicates the UE to delete any one URC-ID then the UE (100) shall not use other assigned URC ID(s) any more in the NAS or AS procedure. Further, the network may delete the other assigned URC-ID(s) from a memory of the UE (100).

All the above embodiments also applicable for an Evolved Packet System (EPS) system where the NG-RAN is eNB and the AMF is an MME.

The FIGS. 1 to 3 are also applicable for inter-system handover procedure from the 5GS to EPS or EPS to 5SG. All the above embodiment is also applied for the case of Xn based inter-PLMN handover. In this case, the target AMF server (300b) and the source AMF server (300a) are same. Also inter-PLMN handover in EPS involving only one MME.

In some embodiments, the UE radio capability information, UE radio access capabilities and UE radio capabilities are same feature.

In one embodiment in scenario described in the FIG. 1 and the FIG. 2, when the target NG-RAN (200b) does not receives set of UE radio capabilities or URC-ID-2 form the target AMF server (300b) in the handover request message and the target NG-RAN (200b) determines that this is inter-PLMN handover case then the target NG-RAN (200b) sends a message to the AMF (300) to get the set of UE radio capabilities. In one example, the NG-RAN (200) includes the URC-ID 1 in the message. The target AMF server (300b) determines the set of UE radio capabilities and sends the UE radio capabilities to the target NG-RAN (200b). The target NG-RAN (200b) uses the received set of UE radio capabilities during the handover procedure.

In one embodiment for scenario defined in the FIGS. 1-3, the target AMF server (300b) includes the set of UE radio capabilities in the source to target transparent container. The target NG-RAN (200b) uses the set of UE radio capabilities included in the source to target transparent container for the handover procedure and subsequent AS and NAS procedure.

In some embodiments in the FIGS. 1-3, the target AMF server (300b) derives the set of UE radio capabilities based on UE manufacturer-assigned UE Radio Capability ID and send this set of UE radio capabilities in the handover request message. The UE (100) shall use this set of UE radio capabilities in handover and subsequent procedure.

The scenarios in the FIGS. 1-3, the source and target AMF procedure are applicable for inter-PLMN handover scenario.

In one example, in the intra PLMN handover case, when the target AMF server (300b) provides the UE radio capability ID in the handover request message and the UE radio capability ID is not mapped to any set of UE radio capabilities in the target RAN (200b) then the target RAN (200b) maps the UE radio capability ID present in the handover request message with the set of UE radio capabilities present in the source to target transparent container. The target RAN (200b) uses this mapping in the NAS or AS procedure.

FIG. 6a illustrates various hardware components of the source NG-RAN (200a), according to an embodiment of the disclosure. The source NG-RAN (200a) includes a processor (210a), a communicator (220a), a memory (230a), and a UE radio capabilities controller (240aa). The processor (210a) is coupled with the communicator (220a), the memory (230a), and the UE radio capabilities controller (240a).

The UE radio capabilities controller (240a) is configured to detect that the handover procedure is the inter-PLMN handover procedure. Further, UE radio capabilities controller (240a) is configured to determine that the target PLMN does not support the UE RAC ID assigned by the source PLMN based on the local configuration and support the RACS. Further, the UE radio capabilities controller (240a) is configured to send the UE radio capabilities instead of RAC ID assigned to the UE radio capabilities by the source PLMN in the source to target transparent container information element to the source AMF server (300a) in response to detecting that the handover procedure is the inter-PLMN handover procedure.

Further, the processor (210a) is configured to execute instructions stored in the memory (230a) and to perform various processes. The communicator (220a) is configured for communicating internally between internal hardware components and with external devices via one or more networks. The memory (230a) also stores instructions to be executed by the processor (210a). The memory (230a) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230a) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 6a shows various hardware components of the source NG-RAN (200a) but it is to be understood that other embodiments are not limited thereon. In other embodiments, the source NG-RAN (200a) may include less or more number of components. Further, the labels or names of the components are used only for illustrative purpose and does not limit the scope of the invention. One or more components can be combined together to perform same or substantially similar function to handle the UE radio capabilities during the handover procedure.

FIG. 6b illustrates various hardware components of the target NG-RAN (200b), according to an embodiment of the disclosure. The target NG-RAN (200b) includes a processor (210b), a communicator (220b), a memory (230b), and a UE radio capabilities controller (240b). The processor (210b) is coupled with the communicator (220b), the memory (230b), and the UE radio capabilities controller (240b).

In an embodiment, UE radio capabilities controller (240b) is configured to proceed with the inter PLMN handover procedure using the UE radio capabilities received from the target AMF server (300b).

In another embodiment, the UE radio capabilities controller (240b) is configured to receive the UE radio capabilities received from the source NG-RAN (200a) through the source AMF server (300a) and the RAC-ID assigned from the target AMF server (300b), where the target NG-RAN (200b) does not have radio capabilities corresponding to the RAC ID assigned in the target PLMN. Further, the UE radio capabilities controller (240b) is configured to proceed with the inter PLMN handover procedure using the UE radio capabilities received from the source NG-RAN (200a)

In another embodiment, the UE radio capabilities controller (240b) is configured to receive the UE radio capabilities from the source NG-RAN (200a) through the source AMF server (300a) and the RAC-ID assigned in the target PLMN from the target AMF server (200b). Further, the UE radio capabilities controller (240b) is configured to proceed with the inter PLMN handover procedure using the UE radio capabilities received from the source NG-RAN (200a).

The processor (210b) is configured to execute instructions stored in the memory (230b) and to perform various processes. The communicator (220b) is configured for communicating internally between internal hardware components and with external devices via one or more networks. The memory (230b) also stores instructions to be executed by the processor (210b). The memory (230b) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230b) may, in some examples, be considered a non-transitory storage medium. The term "non-transitory" may indicate that the storage medium is not embodied in a carrier wave or a propagated signal. However, the term "non-transitory" should not be interpreted that the memory (230b) is non-movable. In certain examples, a non-transitory storage medium may store data that can, over time, change (e.g., in Random Access Memory (RAM) or cache).

Although the FIG. 6b shows various hardware components of the target NG-RAN (200b) but it is to be understood that other embodiments are not limited thereon. In other embodiments, the target NG-RAN (200b) may include less or more number of components. Further, the labels or names of the components are used only for illustrative purpose and does not limit the scope of the invention. One or more components can be combined together to perform same or substantially similar function to handle the UE radio capabilities during the handover procedure.

FIG. 6c illustrates various hardware components of the source AMF server (300a), according to an embodiment of the disclosure. The source AMF server (300a) includes a processor (310a), a communicator (320a), a memory (330a), and a UE radio capabilities controller (340a). The processor (310a) is coupled with the communicator (320a), the memory (330a), and the UE radio capabilities controller (340a). The UE radio capabilities controller (340a) is configured to send the UE radio capabilities to the target AMF server (300b) or the target NG-RAN (200b).

The processor (310a) is configured to execute instructions stored in the memory (330a) and to perform various processes. The communicator (320a) is configured for communicating internally between internal hardware components and with external devices via one or more networks. The memory (330a) also stores instructions to be executed by the processor (310a). The memory (330a) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330a) may, in some examples, be considered a non-transitory storage medium. The term "non-transitory" may indicate that the storage medium is not embodied in a carrier wave or a propagated signal. However, the term "non-transitory" should not be interpreted that the memory (330a) is non-movable. In certain examples, a non-transitory storage medium may store data that can, over time, change (e.g., in Random Access Memory (RAM) or cache).

Although the FIG. 6c shows various hardware components of the source AMF server (300a) but it is to be understood that other embodiments are not limited thereon. In other embodiments, the source AMF server (300a) may include less or more number of components. Further, the labels or names of the components are used only for illustrative purpose and does not limit the scope of the invention. One or more components can be combined together to perform same or substantially similar function to handle the UE radio capabilities during the handover procedure.

FIG. 6d illustrates various hardware components of the target AMF server (300b), according to an embodiment of the disclosure. The target AMF server (300b) includes a processor (310b), a communicator (320b), a memory (330b), and a UE radio capabilities controller (340b). The processor (310b) is coupled with the communicator (320b), the memory (330b), and the UE radio capabilities controller (340b).

In an embodiment, the UE radio capabilities controller (340b) is configured to receive the UE radio capabilities from the source AMF server (300a) and forward the UE radio capabilities to the target NG-RAN (200b). Further, the UE radio capabilities controller (340b) is configured to send the RAC-ID assigned in the target PLMN to the target NG-RAN (200b).

The processor (310b) is configured to execute instructions stored in the memory (330b) and to perform various processes. The communicator (320b) is configured for communicating internally between internal hardware components and with external devices via one or more networks. The memory (330b) also stores instructions to be executed by the processor (310b). The memory (330b) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330b) may, in some examples, be considered a non-transitory storage medium. The term "non-transitory" may indicate that the storage medium is not embodied in a carrier wave or a propagated signal. However, the term "non-transitory" should not be interpreted that the memory (330b) is non-movable. In certain examples, a non-transitory storage medium may store data that can, over time, change (e.g., in Random Access Memory (RAM) or cache).

Although the FIG. 6d shows various hardware components of the target AMF server (300b) but it is to be understood that other embodiments are not limited thereon. In other embodiments, the target AMF server (300b) may include less or more number of components. Further, the labels or names of the components are used only for illustrative purpose and does not limit the scope of the invention. One or more components can be combined together to perform same or substantially similar function to handle the UE radio capabilities during the handover procedure.

FIG. 7a is a flow chart (700) illustrating a method for handling UE radio capabilities during the handover procedure, according to an embodiment of the disclosure.

At 702, the source NG-RAN (200a) detects that the handover procedure is the inter-PLMN handover procedure. At 704, the source NG-RAN (200a) determines that the target PLMN does not support the UE RAC ID assigned by the source PLMN based on the local configuration. At 706, the source NG-RAN (200a) and the target NG-RAN (200b) support the RACS. At 708, the source NG-RAN (200a) sends the UE radio capabilities instead of RAC ID assigned to the UE radio capabilities by the source PLMN in a source to target transparent container information element to the source AMF server (300a).

FIG. 7b is a flow chart illustrating a method for proceeding the handover procedure, according to an embodiment of the disclosure.

At 710, the source AMF server (300a) sends the UE radio capabilities to the target AMF server (300b). At 712, the target AMF server (300b) receives the UE radio capabilities from the source AMF server (300a). At 714, the target AMF server (300b) forwards the UE radio capabilities to the target NG-RAN (200b). At 716, the target NG-RAN (200b) proceed with the inter PLMN handover procedure using the UE radio capabilities received from the target AMF server (300b).

FIG. 7c is a flow chart illustrating a method for proceeding the handover procedure, according to an embodiment of the disclosure.

At 718, the source AMF server (300a) sends the UE radio capabilities to the target NG-RAN (200b). At 720, the target AMF server (300b) sends the RAC-ID assigned in the target PLMN to the target NG-RAN (200b). At 722, the target NG-RAN (200b) receives the UE radio capabilities received from the source NG-RAN (200a) through the source AMF server (300a) and the RAC-ID assigned from the target AMF server (300b), where the target NG-RAN (200b) does not have radio capabilities corresponding to the RAC ID assigned in the target PLMN. At 724, the target NG-RAN (200b) proceeds with the inter PLMN handover procedure using the UE radio capabilities received from the source NG-RAN (200a).

FIG. 7d is a flow chart illustrating a method for proceeding the handover procedure, according to an embodiment of the disclosure.

At 726, the source AMF server (300a) sends the UE radio capabilities to the target NG-RAN (200b). At 728, the target AMF server (300b) sends the RAC-ID assigned in a target PLMN to the target NG-RAN (200b). At 730, the target NG-RAN (200b) receives the UE radio capabilities from the source NG-RAN (200a) through the source AMF server (300a) and the RAC-ID assigned in a target PLMN from the target AMF server (300b). At 732, the target NG-RAN (200b) proceeds with the inter PLMN handover procedure using the UE radio capabilities received from the source NG-RAN (200a).

FIG. 7e is a flow chart illustrating a method for proceeding the handover procedure, according to an embodiment of the disclosure.

At 734, the source AMF server (300a) sends the UE radio capabilities to the target AMF server (300b). At 736, the target AMF server (300b) receives the UE radio capabilities from the source NG-RAN (200a). At 738, the target AMF server (300b) forwards the UE radio capabilities to the target NG-RAN (200b), wherein the target NG-RAN (200b) does not receive the UE RAC ID. At 740, the target NG-RAN (200b) proceeds with the inter PLMN handover procedure using the UE radio capabilities received from the target AMF server (300b).

FIG. 8 is another flow chart (800) illustrating a method for handling UE radio access capabilities during a handover procedure, according to an embodiment of the disclosure. At S802, the source NG-RAN (200a) detects that the handover procedure is the inter-PLMN handover procedure. At S804, the source NG-RAN (200a) determines that source NG-RAN (200a) and the target NG-RAN (200b) supports the Radio Capabilities Signaling Optimization (RACS) for example based on the local configuration. At S806, the source NG-RAN (200a) determines a target PLMN does not support the UE RAC ID assigned by a source PLMN for example based on the local configuration. At S808, source NG-RAN (200a) sends the UE radio access capabilities instead of the RAC ID assigned to the UE radio capabilities by the source PLMN to the target NG-RAN in response to determining that the target PLMN does not support the UE RAC ID assigned by the source PLMN.

At S810, the target NG-RAN (200b) is configured to receive the UE radio access capabilities instead of the RAC ID assigned to the UE radio capabilities from the source NG-RAN (200a) during the handover procedure. At S812, the target NG-RAN (200b) is configured to proceed with the handover procedure using the received UE radio capabilities.

The method can be used for handling UE radio capabilities during a handover procedure by sending a UE radio capabilities instead of RAC ID assigned to the UE radio capabilities by a source PLMN, in a source to target transparent container information element to the target PLMN NG-RAN via one of: source AMF server (300a) or directly to target NG-RAN, from the source NG-RAN (200a) in response to detecting that the handover procedure is a inter PLMN handover procedure. This results in reducing the resource wastage and call drop scenarios in a wireless communication network.

The various actions, acts, blocks, steps, or the like in the flow charts (700 and 800) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for providing user equipment (UE) radio access capabilities in a handover procedure, the method comprising:
   identifying, by a source next-generation radio access network (NG-RAN), that a target public land mobile network (PLMN) does not support a UE radio access capabilities identifier (RAC ID) assigned by a source PLMN in an inter-PLMN handover procedure; and
   providing, by the source NG-RAN, for a target NG-RAN, the UE radio access capabilities in response to identifying that the target PLMN does not support the UE RAC ID assigned by the source PLMN,
   wherein the UE RAC ID is not sent for the target NG-RAN by the source NG-RAN.

2. The method of claim 1, wherein radio capabilities signaling optimization (RACS) is supported by the source NG-RAN.

3. The method of claim 1, wherein the UE radio capabilities are used by the target NG-RAN to proceed with the inter-PLMN handover procedure.

4. The method of claim 1, wherein identifying that the target PLMN does not support the UE RAC ID assigned by the source PLMN comprises identifying that the target PLMN does not support the UE RAC ID assigned by the source PLMN based on a local configuration.

5. The method of claim 1, wherein the UE radio access capabilities are provided in a source to target transparent container information element.

6. A source Next-Generation Radio Access Network (NG-RAN) for transmitting user equipment (UE) radio capabilities in a handover procedure, the source NG-RAN comprising:
   a transceiver; and
   at least one processor configured to:
   identify that a target public land mobile network (PLMN) does not support a UE radio access capabilities identifier (RAC ID) assigned by a source PLMN in an inter-PLMN handover procedure, and
   control the transceiver to provide, for a target NG-RAN, the UE radio access capabilities in response to identifying that the second PLMN does not support the UE RAC ID assigned by the first PLMN, wherein the UE RAC ID is not sent for the target NG-RAN by the source NG-RAN.

7. The source NG-RAN of claim 6, wherein radio capabilities signaling optimization (RACS) is supported by the source NG-RAN and the target NG-RAN.

8. The source NG-RAN of claim 6, wherein the UE radio capabilities are used by the target NG-RAN to proceed with the inter-PLMN handover procedure.

9. The source NG-RAN of claim 6, wherein the UE radio access capabilities are provided in a source to target transparent container information element.

10. The source NG-RAN of claim 6, wherein the at least one processor is further configured to identify that the target PLMN does not support the UE RAC ID assigned by the source PLMN based on a local configuration.

* * * * *